United States Patent [19]

DeBlois

[11] 4,243,188
[45] Jan. 6, 1981

[54] PRECOMPRESSION FIN FOR AXISYMMETRIC INLET ON WINGED HIGH SPEED VEHICLES

[75] Inventor: Raymond L. DeBlois, Tolland, Conn.

[73] Assignee: United Technologies Corporation, Hartford, Conn.

[21] Appl. No.: 930,467

[22] Filed: Aug. 2, 1978

[51] Int. Cl.² ............................................. B64D 27/20
[52] U.S. Cl. ................................ 244/53 B; 102/34.1;
137/15.1; 244/1 N; 244/91
[58] Field of Search ................... 244/53 B, 53 R, 1 N,
244/55, 15, 198, 199, 130, 74, 91, 3.24;
137/15.1, 15.2; 102/34.1, 37.1

[56] References Cited

U.S. PATENT DOCUMENTS

| | | | |
|---|---|---|---|
| 2,997,256 | 8/1961 | Walker | 244/53 R X |
| 3,161,019 | 12/1964 | Keenan et al. | 244/53 R X |
| 3,270,990 | 9/1966 | Webb | 244/53 R |

*Primary Examiner*—Barry L. Kelmachter
*Attorney, Agent, or Firm*—Norman Friedland

[57] ABSTRACT

Precompression fins extending perpendicular from the wings of a high speed missile are judiciously located relative to an axisymmetric inlet of an airbreathing power plant such that the outwash angle induced by the body and wing of the missile enhances the performance of the inlet.

3 Claims, 4 Drawing Figures

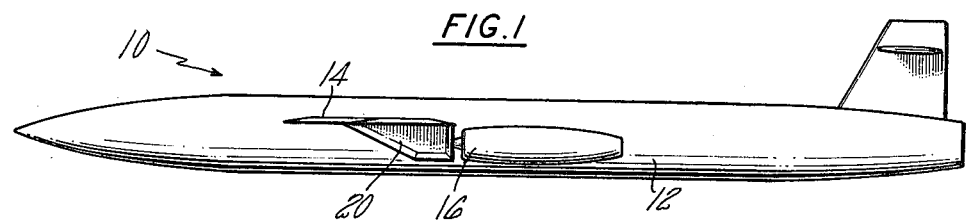
FIG. 1
FIG. 2
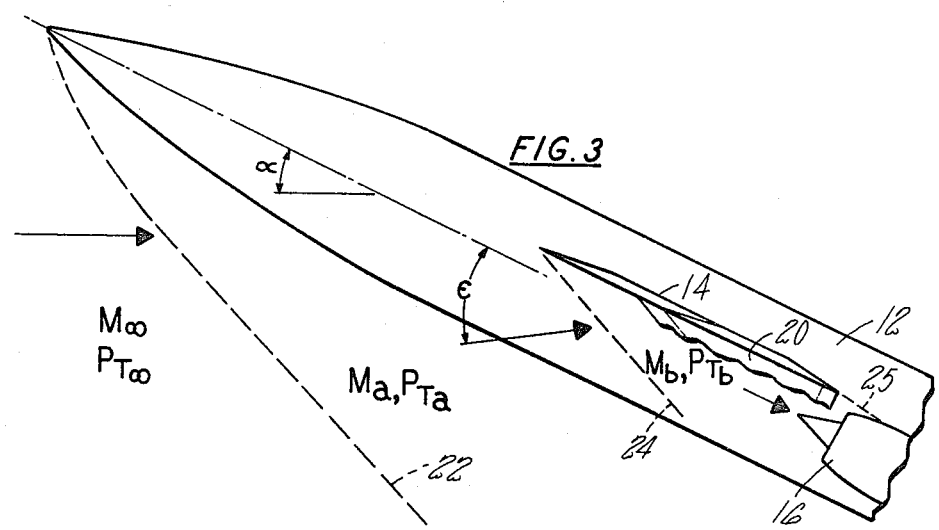
FIG. 3
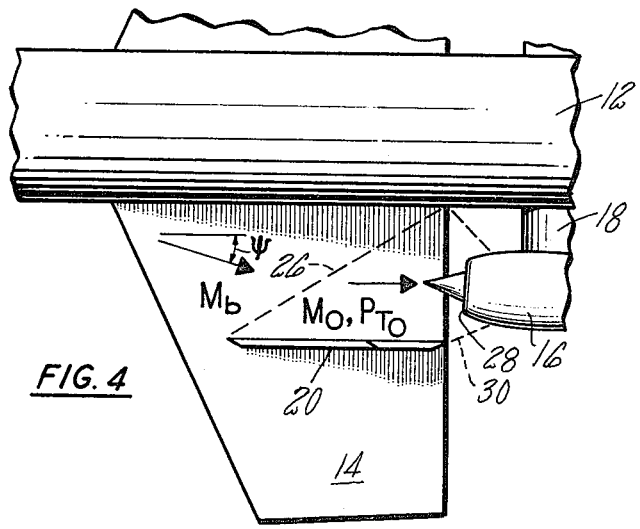
FIG. 4

PRECOMPRESSION FIN FOR AXISYMMETRIC INLET ON WINGED HIGH SPEED VEHICLES

The Government has rights in this invention pursuant to Contract No. F33615-76-C-2131 awarded by the Department of the Air Force.

BACKGROUND OF THE INVENTION

This invention relates to axisymmetric inlets for high speed missiles and particularly to means for improving inlet performance by controlling the outwash angle induced by the body and wings of the missile.

The requirement for highly maneuverable missiles at high altitude has led to winged missile designs in order to achieve adequate lift characteristics. As is well known, the air induction system must be closely integrated with respect to the missile airframe to hold drag to a minimum while satisfying close packaging restrictions and severe weight limitations. Also, it is known that axisymmetric inlets are attractive for these designs because of their relative simplicity and light weight. The problem presented by the use of axisymmetric inlets is that they are sensitive to flow angularity which can adversely affect the operation of the missile.

I have found that I can obviate the sensitivity problem alluded to in the above by providing a precompression member and take advantage of the outwash angle induced by the missile body and underneath surface of the wing. Not only does this invention afford a potential improvement in inlet performance, it eliminates the yaw condition that would otherwise degrade inlet performance.

SUMMARY OF THE INVENTION

A feature of this invention is to provide for a winged missile having an axisymmetric inlet and a precompression fin so as to improve inlet performance by taking advantage of the outwash angle produced by the missile body and underneath surface of the wing.

Other features and advantages will be apparent from the specification and claims and from the accompanying drawings which illustrate an embodiment of the invention.

BRIEF DESCRIPTION OF THE DRAWINGS

FIG. 1 is a view in elevation of a winged missile with dual side-mounted axisymmetric inlets;

FIG. 2 is a front view of the missile showing the precompression fin;

FIG. 3 is a side view showing the ambient condition and particularly the angle of the airflow relative to the inlet; and FIG. 4 is a fragmentary view from the bottom of the missile diagrammatically showing the effect of the outwash angle.

DESCRIPTION OF THE PREFERRED EMBODIMENT

As can be seen from FIG. 1 the missile 10 includes the main body 12, wings 14 and a pair of radially extending axisymmetric inlets 16.

FIG. 2 is a front view of the design showing the highly integrated aspects of the precompression concept. Axisymmetric inlets 16 are oriented such that the wing acts as a precompression and flow alignment device for the inlets in the horizontal plane. The inlets are installed under the wings using well known boundary layer diverters 18 attached to the missile body to reduce interaction between the vehicle surface boundary layer and the flow captured by the inlets. These diverters allow the captured air to be routed into a center line engine without additional external blockage. Likewise, the inlets are displaced below the projected surface of the wing such that no significant interaction occurs between the wing surface boundary layer and the inlet flow.

According to this invention, precompression fins 20 extend vertically from the wing in space relation to the inlet 16 and serve as a second precompression and flow alignment device in the vertical plane. This best can be seen by referring to FIGS. 3 and 4 showing a side view and bottom view of the missile flying at a free stream Mach number, $M_\infty$, and an arbitrary angle of attack, $\alpha$. Local flow properties downstream of the vehicle bow shock 22 and upstream of the wing are represented by the local Mach number, $M_a$, total pressure, $P_{Ta}$, and flow angle, $\epsilon$. Downstream of the wing shock 24, the flow properties are characterized by the local Mach number, $M_b$, and total pressure, $P_{Tb}$. Since the flow must be aligned with the under surface of the wing, the inlet is subjected to zero flow angularity in this view. This effectively places the inlet at zero angle of attack, a condition which is required to prevent degradation of axisymmetric inlet performance. Axially, the inlet is positioned far enough behind the wing leading edge to prevent interaction with the wing leading edge Mach line at the maximum Mach number, $M_a$. Likewise, the inlet cowl should be positioned forward of the wing trailing edge Mach line 25 at the minimum operating Mach number.

In FIG. 4, it is appreciated that although the flow is parallel to the under surface of the wing, a significant outwash angle, $\psi$, persists. Without the precompression fin, existence of the outwash angle would effectively place the axisymmetric inlet in yaw, a condition which characteristically degrades the performance of axisymmetric inlets severely. The precompression fin 20 extending from the under surface of the wing and just outboard of the inlet is discretely located to take advantage of the outwash angle, $\psi$, thereby providing additional compression ahead of the inlet. This concept therefore provides precompression in two planes and thus ensures that the axisymmetric inlets are subjected to zero flow angularity. The inlet must be positioned radially from the missile center line such that the precompression fin oblique shock 26 reflected from the vehicle surface intersects the inlet behind the cowl lip plane 28 at the lowest operating Mach number, $M_o$, and highest sidewash angle, $\psi$, combination. Likewise the fin trailing edge Mach line 30 must intersect the inlet behind the cowl lip plane at the lowest operating Mach number, $M_o$.

It is recognized that the inclusion of the depending fin 20 will introduce some amount of drag and may have a destabilizing effect. These considerations can be taken into account in the detailed design of the fin and associated aerodynamic control system. Thus, if the fin incurs a destabilizing effect, well known means may be employed to compensate therefore.

It should be understood that the invention is not limited to the particular embodiments shown and described herein, but that various changes and modifications may be made without departing from the spirit and scope of this novel concept as defined by the following claims.

I claim:

1. For a high speed, winged missile having a pair of side mounted axisymmetric inlets having a forward facing opening for leading air to an air breathing power plant, each of said inlets being axially spaced from the trailing edge of each of the wings of said missile and disposed relative to the airstream so as to be at substantially zero flow angularity in the horizontal plane, means for subjecting said inlets to zero flow angularity in the vertical plane, said means including a pair of fins, each fin extending vertically from the undersurface of one of the wings and spaced outboard from one of the inlets so as to form a precompression member and being aligned parallel to the center line of said missile, said precompression member having a trailing edge spaced forwardly of said forward facing opening.

2. For a high speed, winged missile as in claim 1 including cowls defining said inlets and each inlet having a lip on its upstream end relative to the airflow wherein said inlets being positioned radially from the missile center line such that the oblique shock of each of said fins reflected by the body of said missile is behind the forward facing opening of each of said inlets and behind the plane of the cowl's lip at the lowest operating Mach number and highest sidewash angle.

3. For a high speed, winged missile as in claim 2 wherein the Mach line of the trailing edge of said fins intersects said inlets behind the cowl lip plane at the lowest operating Mach number.

* * * * *